J. C. & W. H. HICKLIN.
MOWER ATTACHMENT.
APPLICATION FILED JULY 24, 1914.
1,179,310.
Patented Apr. 11, 1916.
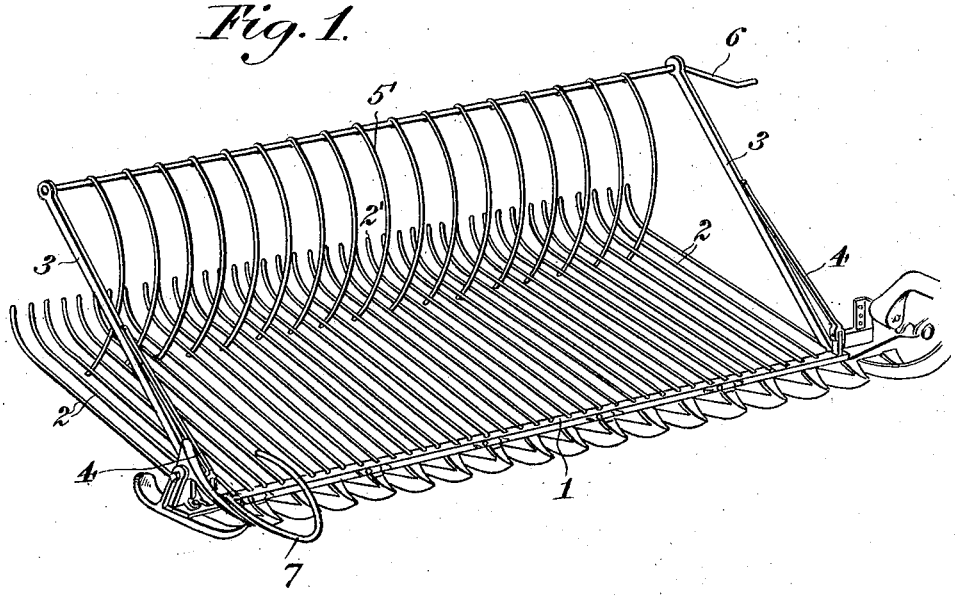
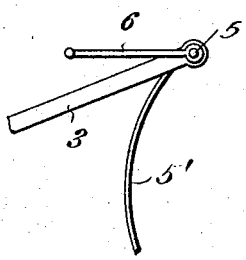
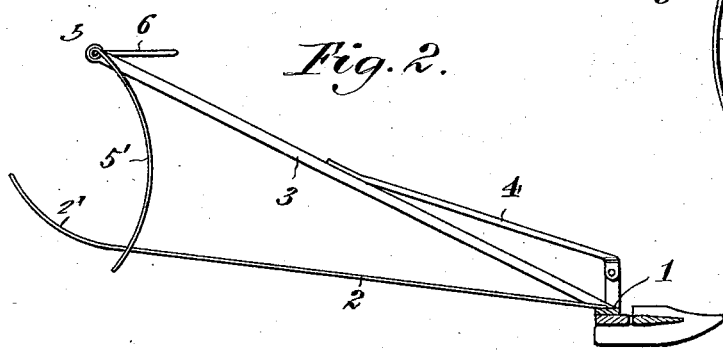
Inventors,
J. C. Hicklin
W. H. Hicklin.
By Victor J. Evans,
Attorney.

UNITED STATES PATENT OFFICE.

JAMES C. HICKLIN AND WILLIAM H. HICKLIN, OF EDGMOOR, SOUTH CAROLINA.

MOWER ATTACHMENT.

1,179,310.  Specification of Letters Patent.  Patented Apr. 11, 1916.

Application filed July 24, 1914. Serial No. 852,848.

*To all whom it may concern:*

Be it known that we, JAMES C. HICKLIN and WILLIAM H. HICKLIN, citizens of the United States, residing at Edgmoor, in the county of Chester and State of South Carolina, have invented new and useful Improvements in Mower Attachments, of which the following is a specification.

This invention relates to grain bunching devices, and it has for its object to produce a simple and improved device which is capable of being readily attached to an ordinary mowing machine for the purpose of bunching or accumulating grain that may be cut by the mower, the purpose being to provide a platform on which the grain will fall and where it will rest substantially undisturbed until a suitable quantity has been accumulated; the platform being formed of tines or fingers extending rearwardly with respect to the cutting apparatus, and said tines or fingers having materially upturned rear ends that form an abutment lying in the path of the cut grain, so that the latter will remain on the platform in substantially the position which it occupies when the stalks are first severed until a sufficient quantity has been accumulated; means being provided whereby the bunch of cut grain may be bodily lifted over the upturned rear ends of the platform fingers and deposited on the ground.

The invention consists of the novel features, details of construction and combination of parts, which hereinafter will be more particularly set forth, illustrated and claimed.

In the drawings hereto attached:—Figure 1 is a detail view of a grain catcher embodying the invention showing the same applied to a mower. Fig. 2 is a longitudinal sectional view. Fig. 3 is a detail view of the revolving rake.

Corresponding and like parts are referred to in the following descriptions, and indicated in all the views of the drawings by the same reference characters.

The improved bunching device comprises a bar 1 adapted to be superposed on the cutter bar of an ordinary mowing machine, as seen in Fig. 1, said bar having rearwardly extending fingers or tines 2, the latter being provided with materially upturned rear ends that coöperate to form an abutment 2' at the rearward portion of the platform formed by the fingers 2, the latter being arranged closely together so as to be capable of supporting cut grain. Upwardly and rearwardly inclined arms 3 are provided, said arms being reinforced by braces 4, and said arms affording bearings for a shaft or rake head 5 having curved teeth 5', the curvature of which is such that the convex faces of the rake teeth will be presented forwardly when the rake is at rest, as seen in Figs. 1 and 2. A lever is attached to one end of the shaft of the rake and serves as means for turning such rake to effect discharge of the grain. A divider 7 is located in the outer end of the cutter bar of the mower and consists preferably of a rod bent into the form substantially shown, such divider serving to gather in the grain and direct such grain to the cutting mechanism.

The tines 2 of the device are set sufficiently close together to constitute a platform on which the grain will be temporarily deposited without danger of escaping between said tines. When a sufficient quantity has accumulated, the rake is rotated once, the rake teeth being swung from their normal or initial position in a rearward direction and thence upwardly, forwardly and downwardly with the result that the points of the teeth will engage the accumulated grain and sweep the latter rearwardly over the upturned rear ends of the tines 2, thus depositing the grain upon the ground in a compact bunch, whereby the gathering thereof will be greatly facilitated when it is desired to house and thresh the same.

It will be observed that in this device it is not intended that the material cut by the mower shall be carried rearward on the platform by frictional contact with the stubble, the fingers composing the platform being upturned so as to form a wall or abutment which will coöperate with the rake to maintain the cut grain in the initial position occupied thereby on the platform when first cut. This is important in order that the heads of the grain, as well as the butts thereof, may be kept in substantial alinement. When a sufficient quantity or bunch has been accumulated to form one or more sheaves the operator, by means of the crank or lever 6, rotates the rake once, the rake teeth being moved rearwardly, upwardly, forwardly and downwardly, the latter part of the movement causing the rake teeth to engage the bunch of grain and to lift and sweep the same bodily over the upturned rear ends 2' of the fingers 2 and depositing the same on the ground without materially disturbing the position of the individual stalks.

From the foregoing description, taken in connection with the accompanying drawings, the advantages of the construction and of the method of operation will be readily apparent to those skilled in the art to which the invention appertains, and while we have described the principle of operation of the invention, together with the device which we now consider to be the best embodiment thereof, we desire to have it understood that the device shown is merely illustrative, and that such changes may be made when desired as are within the scope of the invention as claimed.

Having thus described the invention, what is claimed as new is:

A grain bunching attachment for mowers comprising a bar adapted to be superposed on the cutter bar of a mowing machine, said bar having rearwardly extending fingers with materially upturned rear ends forming an abutment for the cut grain, upwardly and rearwardly inclined reinforced brackets, a rake head swingingly supported in said brackets and having a crank whereby it may be rotated, and rake teeth extending from said head and normally coacting with the upturned rear ends of the fingers to obstruct rearward movement of the cut grain, said rake teeth being curved to present their convex faces in a forward direction when in grain obstructing position.

In testimony whereof we affix our signatures in presence of two witnesses.

JAMES C. HICKLIN.
WILLIAM H. HICKLIN.

Witnesses:
J. R. HAMILTON,
J. N. WHITESIDE.

Copies of this patent may be obtained for five cents each, by addressing the "Commissioner of Patents, Washington, D. C."